(12) United States Patent
Sundell et al.

(10) Patent No.: US 11,348,353 B2
(45) Date of Patent: May 31, 2022

(54) DOCUMENT SPATIAL LAYOUT FEATURE EXTRACTION TO SIMPLIFY TEMPLATE CLASSIFICATION

(71) Applicant: Automation Anywhere, Inc., San Jose, CA (US)

(72) Inventors: Michael Sundell, Thousand Oaks, CA (US); Vibhas Gejji, Fremont, CA (US)

(73) Assignee: Automation Anywhere, Inc., San Jose, CA (US)

( * ) Notice: Subject to any disclaimer, the term of this patent is extended or adjusted under 35 U.S.C. 154(b) by 247 days.

(21) Appl. No.: 16/779,462

(22) Filed: Jan. 31, 2020

(65) Prior Publication Data

US 2021/0240975 A1 Aug. 5, 2021

(51) Int. Cl.
| | |
|---|---|
| *G06V 30/414* | (2022.01) |
| *G06F 16/93* | (2019.01) |
| *G06F 17/16* | (2006.01) |
| *G06K 9/62* | (2022.01) |
| *G06N 3/08* | (2006.01) |
| *G06V 30/412* | (2022.01) |

(52) U.S. Cl.
CPC ............ *G06V 30/414* (2022.01); *G06F 16/93* (2019.01); *G06F 17/16* (2013.01); *G06K 9/6267* (2013.01); *G06N 3/08* (2013.01); *G06V 30/412* (2022.01)

(58) Field of Classification Search
CPC ........... G06K 9/00449; G06K 9/00463; G06K 9/6267; G06F 16/93; G06F 17/16; G06N 3/08
USPC ....................................................... 382/176
See application file for complete search history.

(56) References Cited

U.S. PATENT DOCUMENTS

| | | | |
|---|---|---|---|
| 8,724,907 B1 * | 5/2014 | Sampson | G06K 9/00483 382/218 |
| 9,171,359 B1 | 10/2015 | Lund | |
| 10,015,503 B1 | 7/2018 | Ahammad | |
| 10,489,682 B1 | 11/2019 | Kumar et al. | |
| 2002/0029232 A1 | 3/2002 | Bobrow et al. | |
| 2006/0218110 A1 | 9/2006 | Simske et al. | |
| 2007/0030528 A1 | 2/2007 | Quaeler et al. | |

(Continued)

FOREIGN PATENT DOCUMENTS

WO 2019/092672 A2 5/2019

OTHER PUBLICATIONS

A density-based algorithm for discovering clusters in large spatial databases with noise, Ester, Martin; Kriegel, Hans-Peter; Sander, Jörg; Xu, Xiaowei, Simoudis, Evangelos; Han, Jiawei; Fayyad, Usama M., eds., Proceedings of the Second International Conference on Knowledge Discovery and Data Mining (KDD-96). AAAI Press, pp. 226-231 (1996).

(Continued)

*Primary Examiner* — Daniel G Mariam

(57) ABSTRACT

Image encoded documents are identified by recognizing known objects in each document with an object recognizer. The objects in each page are filtered to remove lower order objects. Known features in the objects are recognized by sequentially organizing each object in each filtered page into a one-dimensional array, where each object is positioned in a corresponding one-dimensional array as a function of location in the corresponding filtered page. The one-dimensional array is then compared to known arrays to classify the image document corresponding to the one-dimensional array.

15 Claims, 6 Drawing Sheets

(56) References Cited

U.S. PATENT DOCUMENTS

| | | |
|---|---|---|
| 2013/0236111 A1 | 9/2013 | Pintsov |
| 2018/0218429 A1* | 8/2018 | Guo et al. |
| 2019/0005050 A1* | 1/2019 | Proux ................ G06K 9/00463 |
| 2019/0213822 A1* | 7/2019 | Jain ...................... G07D 7/2083 |
| 2019/0266692 A1 | 8/2019 | Stach et al. |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0097742 A1 | 3/2020 | Kumar et al. |
| 2020/0151591 A1 | 5/2020 | Li |

OTHER PUBLICATIONS

Deep Residual Learning for Image Recognition, by K. He, X. Zhang, S. Ren, and J. Sun, arXiv:1512.03385 (2015).

FaceNet: A Unified Embedding for Face Recognition and Clustering, by F. Schroff, D. Kalenichenko, J. Philbin, arXiv: 1503.03832 (2015).

Muhammad et al. "Fuzzy multilevel graph embedding", copyright 2012 Elsevier Ltd.

Sharma et al. Determining similarity in histological images using graph-theoretic description and matching methods for content-based image retrieval in medical diagnostics, Biomed Center, copyright 2012.

International Search Report and Written Opinion for PCT/US2021/015691, dated May 11, 2021.

* cited by examiner

INVOICE — 201
7836248 — 202

Automation Anywhere, Inc. — 203
633 River Oaks Pkwy
San Jose, CA 95134

Bill To:
Your Company, Inc. — 204
123 Fake St.
San Jose, CA 95134

205
Date: Dec 4, 2017
Payment Terms: NET 30 — 206
Due Date: Jan 1, 2018 — 207
208 — Balance Due: $66.40

| Item | Quantity | Rate | Amount |
|---|---|---|---|
| Widget | 3 | $1 | $3 |
| Gadget | 4 | $2 | $8 |
| Stuff | 100 | $0.50 | $50 |

209

| | Subtotal: | $61 |
|---|---|---|
| | Tax (9%): | $5.40 |
| | Total: | $66.40 |

210

211

212 — AUTOMATION ANYWHERE

DOCUMENT SPATIAL LAYOUT FEATURE EXTRACTION TO SIMPLIFY TEMPLATE CLASSIFICATION

FIELD OF THE DISCLOSURE

This disclosure relates generally to the field of data processing systems and more particularly to detection and retrieval of information from digitized documents.

BACKGROUND

Accurate identification and extraction of data from business documents is an important aspect of computerized processing of business documents. Such documents are usually formatted in a manner to be easily discernible to a human. While the documents have a discernible structure, they tend to have numerous variations that make computerized processing problematic and error prone. For example, the documents are typically received in image form, so the content needs to be extracted for computerized processing. This can lead to numerous errors. For example, two versions of the same document may have visual differences due to scanning differences, say at different resolutions, or because of visual artifacts in the documents. Moreover, it is often the case that the same type of business document, such as an invoice, for example, has differences in formatting, differences in terminology, and differences in the granularity and amount of information. These small differences can lead to complications and inaccuracies in automated processing of such documents, such as by Robotic Process Automation (RPA). There is accordingly a need for improved computerized processing and recognition of business documents.

SUMMARY

A computerized system and method that generates a "document layout identifier" akin to a fingerprint through feature extraction while performing spatial layout processing is disclosed herein. Documents are scanned into an image, which contains information in a two-dimensional structure. The document image is processed to identify text segments and other blocks.

Documents based on the same template organize information into specific locations within the document. A document containing forms is a typical example of this. Knowing which template a document originates from means that a system may be trained to find information by its location within that document. A classification process then groups documents from different sources using an algorithm that recognizes similarities in the layout structure. The data extraction process can therefore make assumptions about the location of specific information.

Documents that originate from the same template have numerous variations in the exact location, shape, and size of document objects, which makes the process of identifying the template more difficult. The variations in documents can lead to too many classification groups where we seek to group documents by the similarity of their layout structure. To simplify this process, the disclosed embodiments operate to limit the number of features considered in the classification process used to group documents.

A top-down Logical Layout Analysis (LLA) approach is employed using an object recognizer to identify document objects, their location, size, shape, and content. This information representative of objects organized in a two-dimensional layout is organized into a one-dimensional vector array with associated document object metadata. The vector array may then be compared to known arrays to accurately classify image documents for further processing.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2 shows an image of a document in the form of an invoice that may be processed by the system of FIG. 1.

DETAILED DESCRIPTION

In the following detailed description, reference will be made to the accompanying drawings, in which identical functional elements are designated with like numerals. Elements designated with reference numbers ending in a suffix such as 0.1, 0.2, 0.3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
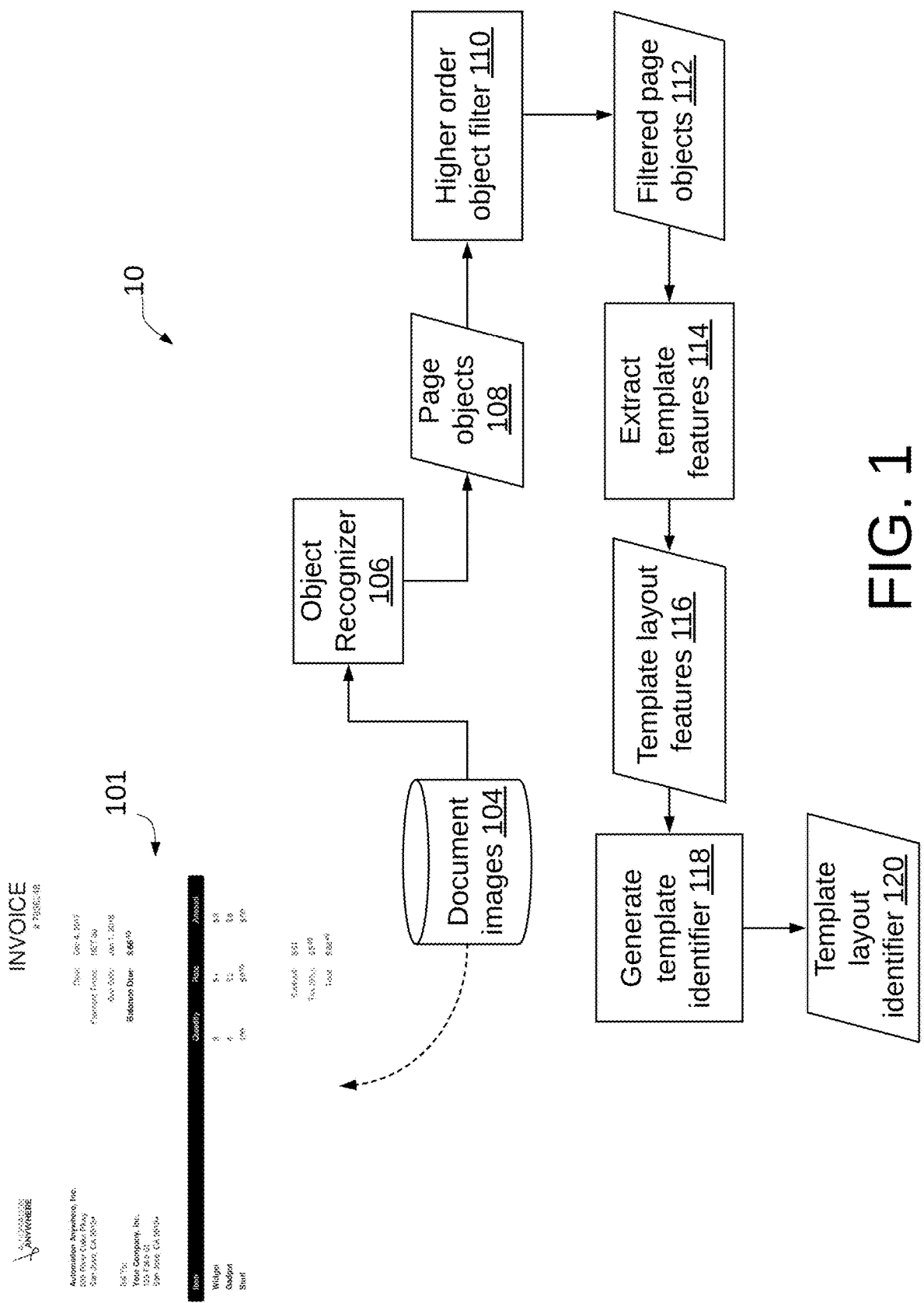
FIG. 1 is a high-level flow diagram of an embodiment of a system for performing document spatial layout feature extraction to generate a template identifier.

FIG. 1 is a high-level flow diagram of an embodiment of a system 10 for performing document spatial layout feature extraction to generate a template layout identifier 120 which is employed by the system 10 to classify digitized documents into known document types. In FIG. 1 a digitized document image 101 is retrieved from a document image repository 104. The document image 101, which may be a conventionally encoded image file such as a PDF, TIFF, or JPEG file is shown in further detail in FIG. 2. As seen in FIG. 2, the document 101 takes the form of an English-language invoice) converted to a monochrome image. The invoice shown in FIG. 2 is one example of a semi-structured document that may be processed by the system 10. A semi-structured document is one that is characterized by a pre-defined format containing one or more fields, where at least some of the fields has an associated label. A semi-structured document is distinguished from a fully-structured document that is characterized by a regular structure, such as a spreadsheet, organized in rows and columns defining a plurality of cells, which contain the information in the document. In contrast, an unstructured document has no discernible fields. An example of an unstructured document is one that contains only an image or only text or a combination of image and text that has no discernible fields. A semi-structured document such as document 101 has a plurality of fields, some of which may have an associated explicit label.

As seen, invoice 200, which may be one of the document images 101, has a number of labels and associated data fields that are necessary for an invoice. The invoice is labeled as an "invoice" at 201. There is an invoice number 202 that uniquely identifies the invoice. The invoicing entity and address, seen at 203, identify the entity issuing the invoice. The recipient of the invoice is shown at 204. In addition, the invoice has a date field 205, payment terms 206, a due date 207 and a balance due 208. An itemized listing of the items supplied by the invoicing entity is shown at 209, with associated amounts for quantity, rate (price per item), and total amount for the item. Subtotal amount, tax and total are shown at 210. The invoice 200 can also be seen to be formatted with text of different sizes and with varying font characteristics such as the use of bold font in certain places such as for "Balance Due" at 208 for the label "Balance Due" and the associated amount "$66.49". As seen the amount 66.49 is in a form in which the cents are represented in a smaller font, in superscript format. As will be appreciated by those skilled in the art, alternative representations may also be found in other invoices. Different sizes of fonts are also used, such as for Invoice field 201 which is in a larger font than other fields. A company logo is also seen at 212. Also, a table header bar is seen at 211 with text in reverse color (white on black) contained therein.

Turning back to FIG. 1, the document image 101 is processed by an object recognizer 106 which performs object detection to identify and extract document features and to identify their location, size, and type. The extracted document features are used to extract template layout identifiable features 116. In one embodiment, the object recognizer 106 may take the form of an engine which performs a top-down type of object recognition such as a conventional Deep Neural Network. In another embodiment, the object recognizer 106 may take the form of an engine which performs a bottom up type of object recognition. An example of such bottom up object recognition may be a conventional OCR engine which is capable of recognizing words. Certain OCR engines may also be configured to recognize combinations of words, such as phrases and sentences and may be able to detect semantic meanings to further recognize object types.

An example of a DNN that may be able to implement object recognizer 106 is Faster R-CNN, such as described by Shaoqing Ren et al. in "Faster R-CNN: Towards Real-Time Object Detection with Region Proposal Networks", Microsoft Research. Another example is SSD, such as described by Wei Liu et al. in SSD: Single Shot MultiBox Detector, *Proceedings of the European Conference on Computer Vision (ECCV)* (2016). Another example is YOLO, such as described by Joseph Redmon, et al. in "YOLO9000: Better, Faster, Stronger, Univ. of Washington, Allen Institute for AI (2016). These are exemplary of the DNNs that may be employed and any Convolutional Neural Network (CNN) based object detection architecture can be employed by training the DNN to identify objects in document images, where the objects take the form of standard elements of business documents such as headers, logos, addresses, tables, and signatures. For example, if the domain of interest is English language invoices, then the training images will comprise a large number (e.g. a few tens of thousands) of invoices in which human workers will draw bounding boxes around all objects in the invoice image. The image after preprocessing along with a set of rectangle coordinates (manually produced by human workers) forms the training data for the DNN.

An example of an OCR engine that may be employed in a bottom up implementation of object recognizer 106 is described in U.S. Pat. No. 10,489,682, entitled OPTICAL CHARACTER RECOGNITION EMPLOYING DEEP LEARNING WITH MACHINE GENERATED TRAINING DATA. This patent describes a system that operates to break up a document image into sub-images of characters, words, or even group of contiguous words in a line. In contrast to conventional OCRs, that decode one character at a time, the disclosed system is based on a neural network and can decode groups of words.

Extracted page objects 108 (such as seen in FIG. 2) are provided to a higher order object filter 110 so that only significant template layout features remain. Higher order page objects tend to provide higher identification revealing value for the purpose of identifying document characteristics, e.g., a template layout types or document types, while lower-order page objects tend to provide lower identification revealing value. Higher-order page objects, e.g. logos, headers, addresses, table structure, invoice numbers, size of objects, are retained by the high-order object filter 110, while lower-order objects like table rows, columns, page numbers, and fields are filtered out. The granularity at which the higher order object filter 110 operates can be varied to optimize the granularity based on the characteristics of the documents in the document image repository 104. For different types of documents, what constitutes a higher order object and a lower order object will vary. In one embodiment, the granularity is set to minimize the number of different types of documents in the document image repository 104. Page object properties considered for equality evaluation are type, size, and shape. Type refers to the type of object. Examples of object type include image/logo, page header, paragraph, address. Object types can also include subtypes, for example address/shipping address. Size refers to the two-dimensional size of the object. Shape refers to the physical shape of the object, such as rectangle, circle, oval, etc. Each array item contains a template layout feature object with properties for type, size and shape. The output of the higher order object filter 110 is a set of filtered page objects 112 for each document image. Each of the filtered page objects 112 have noise filtered out by the higher order object filter 110. For example, the higher order object filter 110 will remove document objects that are not relevant to the grouping/classification of a document. This removes noise from a document and reduces the number of different types of documents. For example, the threshold under which the higher order object filer 110 should be set to remove objects that may be extraneous to the classification of a document.

Figure 3:
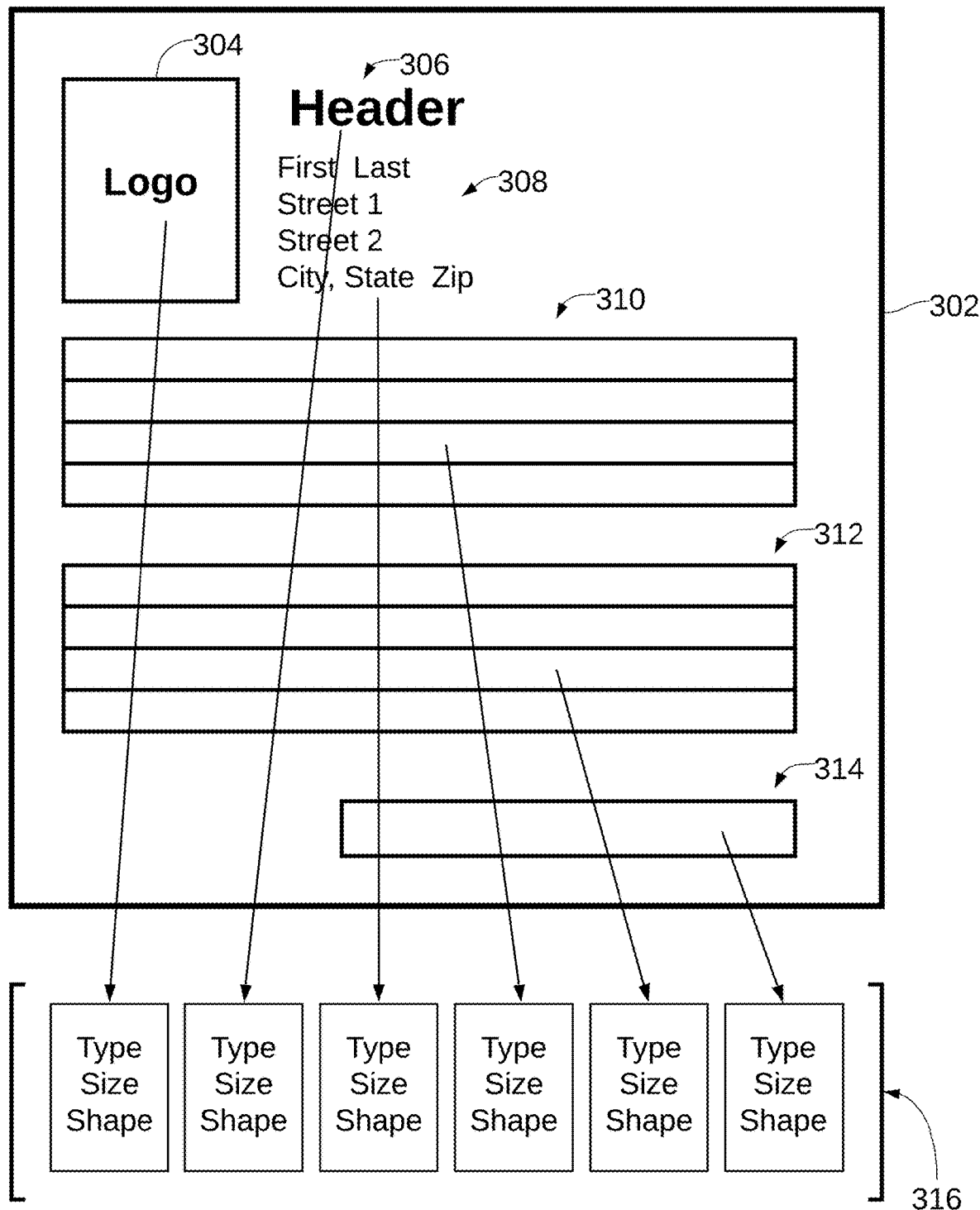
FIG. 3 shows an embodiment in which document page objects are mapped to a one-dimensional vector array in sequential order.

The page objects 112 are processed at 114 to extract template features by sequentially organizing each page object in a one-dimensional array as shown in FIG. 3. FIG. 3 depicts a generalized version of a business document 302 which comprises a plurality of objects such as seen at 304 (logo), 306 (header), 308 (address, including first name, last name, street address—2 lines and city, state and zip code), and first, second and third features (310, 312, 314) which may be for example tables (310, 312) and a signature line 314. The objects in FIG. 3 are generalized examples of the more specific features seen in the example of FIG. 2 where the logo 212 corresponds to the logo 304, header 201 corresponds to header 306, address 203 corresponds to address 308 and tables 209 and 210 correspond to features 310 and 312. In FIG. 3, the document page objects 304, 306, 308, 310, 312, and 314 are each mapped to a one-dimensional vector array 316 in sequential order. As seen in FIG. 3, each element in the array 316 includes a plurality of attributes of the corresponding page object: type, size, and shape. The position in the array 316 indicates the relative location in the document image, with logo 304 being first, header 306 being second, address 308 being third, feature 310 being fourth, feature 312 being fifth and feature 314 being sixth.

Figure 4:
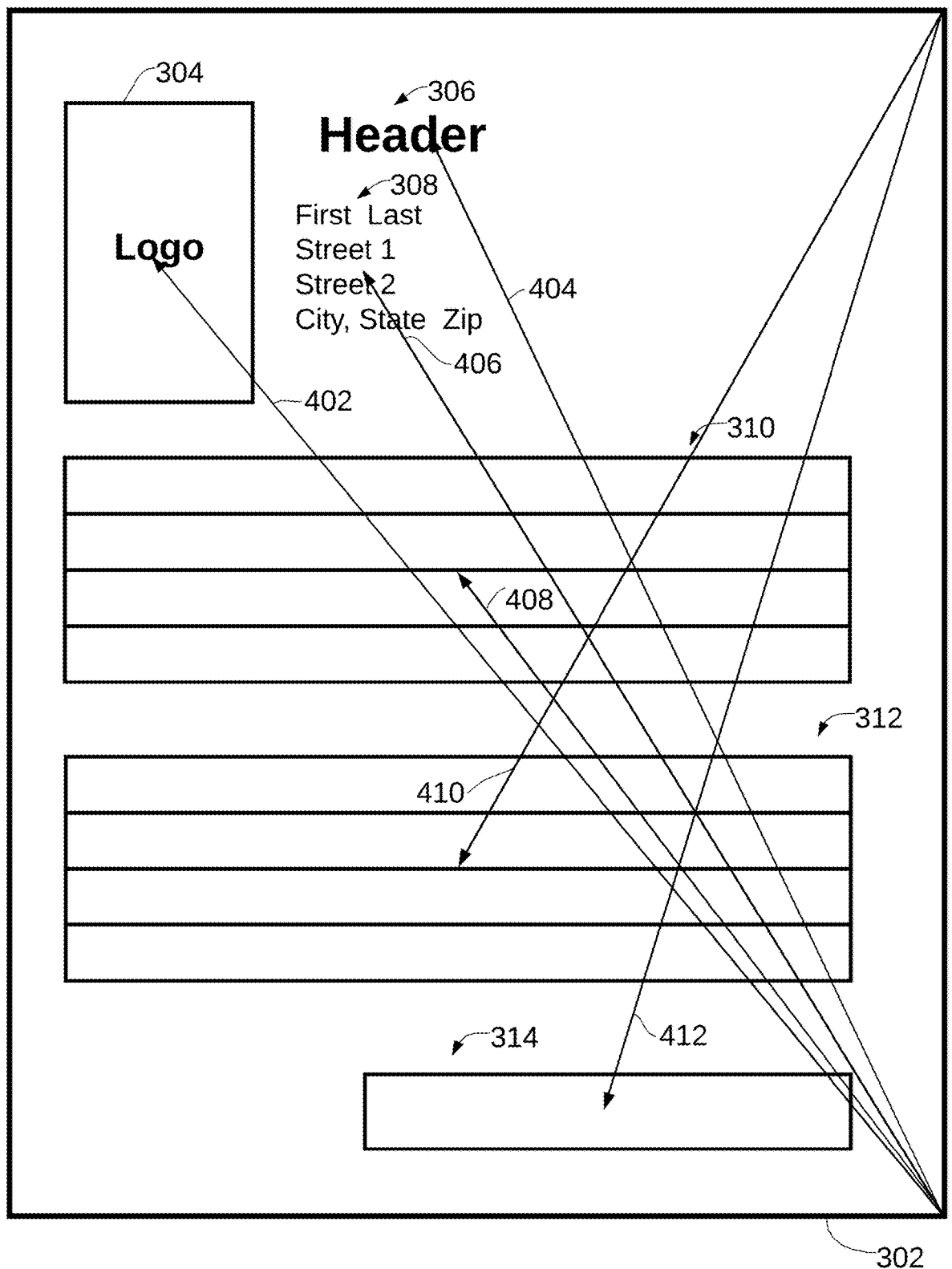
FIG. 4 shows an embodiment in which document page object locations are mapped to a one-dimensional vector array that originates from the document top-right or bottom-right corners.
Figure 5:
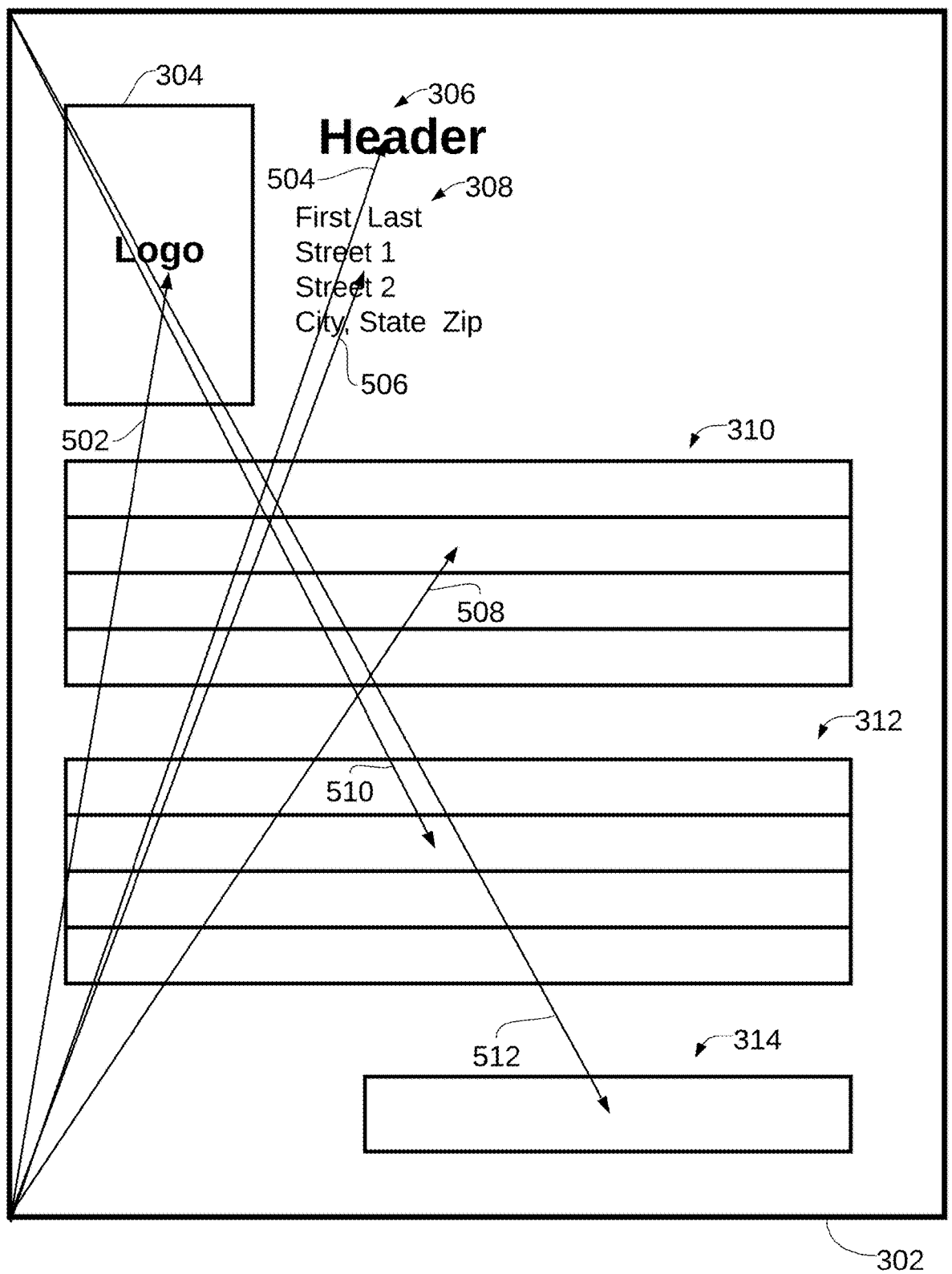
FIG. 5 shows an embodiment in which document page object locations are mapped to a one-dimensional vector array that originates from the document top-left or bottom-left corners.

Generation of the template layout features 116 is performed, as noted above, using location of each object in the document image. As seen in FIG. 4, the objects are sequenced based on their document layout location, organized top-to-bottom and then left-to-right. Each page object location is converted into a vector from either the top-right corner, or the bottom-right corner, depending on which origin point that yields a vector with the larger magnitude. This provides a simple method of identifying which page object that is top-most and left-most, to bottom-most and right-most and permits using location of the objects to generate a sequence. The one-dimensional nature of the array permits simplified comparisons with other arrays to determine similarities and differences. An alternative embodiment is shown in FIG. 5, in which each page object location is converted into a vector from either the top-left corner, or the bottom-left corner, depending on which origin point that yields a vector with the larger magnitude. In one embodiment, the vector is generated to terminate in the center point of the object.

Calculation of the relative magnitude at 118 of each vector to generate template layout identifier 120 may be performed in one embodiment using a technique such as the Levenshtein distance, which provides a way of calculating a score based on an edit distance. The result of a Levenshtein distance computation is a number that indicates how different two strings are. The higher the number, the greater the difference between two strings. Further details of calculation of a Levenshtein distance may be found for example in Levenshtein Distance, in Three Flavors, by M. Gilleland available at people.cs.pitt.edu.

In one embodiment, the angle and magnitude of each vector is employed to order the vectors. If the difference between two vectors is small, the ordering of objects can be modified slightly to increase similarity. For example, two vectors that are different may be made to be the same, or the difference may be reduced by reordering of one or two objects. In the event that the difference between two vectors is large then object reordering is unlikely to work so the ordering is left untouched.

The resulting ordered set of vectors in the template layout identifier 120 may be employed to process each one-dimensional array by comparing each one-dimensional array to a plurality of known one-dimensional arrays where each of the known one-dimensional arrays corresponds to an image encoded document having a known formatting. A document in image format may be classified into a classification, where each class in the classification has a known formatting. Small variations are accommodated by way of a match threshold which is adjustable to change the variations that may be accommodated.

As can be appreciated by those skilled in the art when viewing FIGS. 4 and 5, vectors corresponding to objects that are farther from the vector origin will exhibit greater sensitivity to small changes in the vector angle, while objects that are closer to the vector origin will exhibit lesser sensitivity to small changes in the vector angle. In one embodiment, vectors from two origin points are generated, such as the origin points in FIGS. 4 and 5 and a one-dimensional vector array 316 is generated for each of the resulting sets of vectors. The two sets of resulting vectors may then be processed, such as by taking an average, to generate a resultant one-dimensional vector array.

Figure 6:
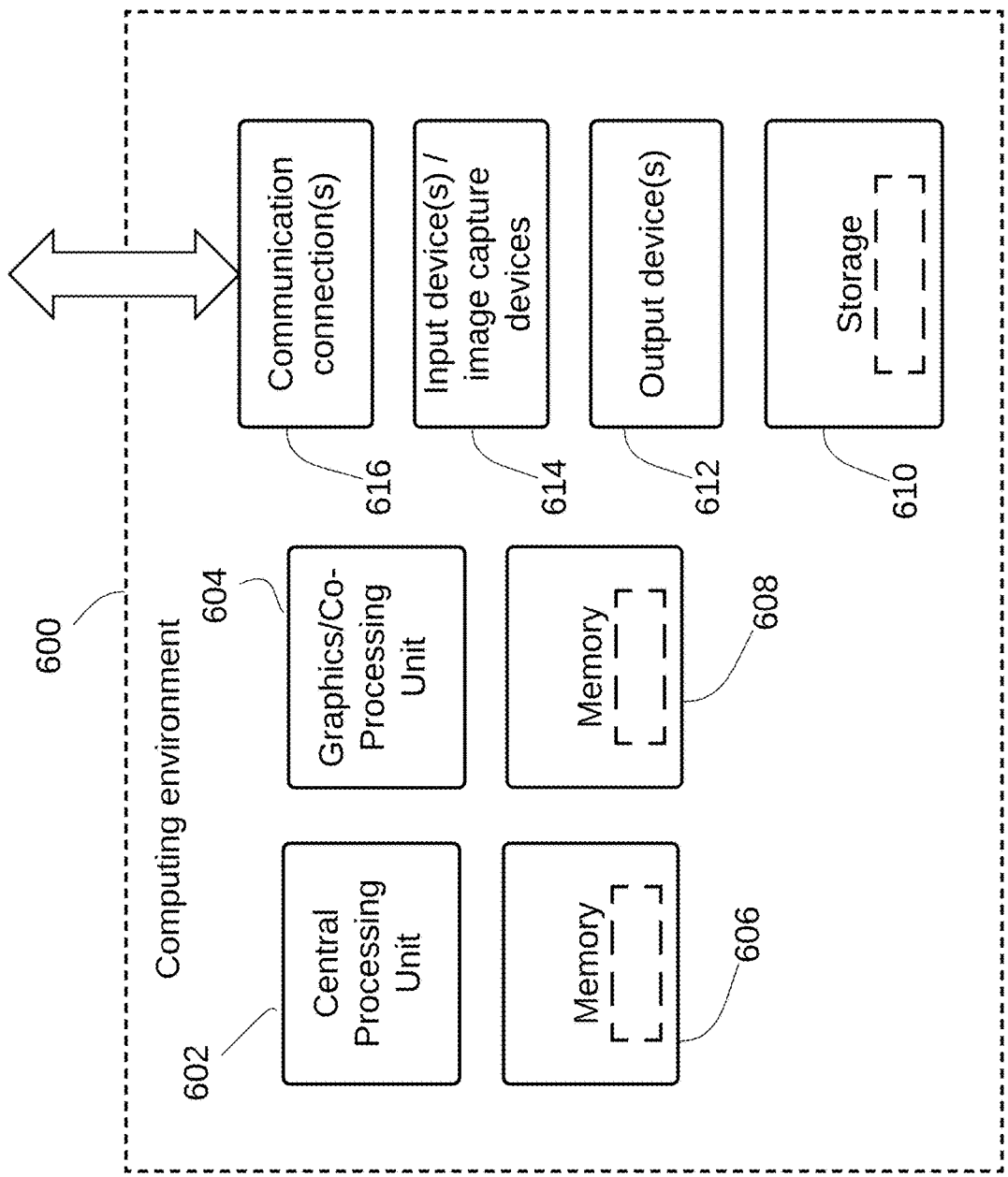
FIG. 6 illustrates a block diagram of hardware that may be employed in an implementation of the systems disclosed herein.

FIG. 6 illustrates a block diagram of hardware that may be employed in an implementation of the RPA system as disclosed herein. FIG. 6 depicts a generalized example of a suitable general-purpose computing system 600 in which the described innovations may be implemented in order to improve the processing speed and efficiency with which the computing system 600 operates to perform the functions disclosed herein. With reference to FIG. 6 the computing system 600 includes one or more processing units 602, 604 and memory 606, 608. The processing units 602, 606 execute computer-executable instructions. A processing unit can be a general-purpose central processing unit (CPU), processor in an application-specific integrated circuit (ASIC) or any other type of processor. The tangible memory 606, 608 may be volatile memory (e.g., registers, cache, RAM), non-volatile memory (e.g., ROM, EEPROM, flash memory, etc.), or some combination of the two, accessible by the processing unit(s). The hardware components in FIG. 6 may be standard hardware components, or alternatively, some embodiments may employ specialized hardware components to further increase the operating efficiency and speed with which the system 100 operates. The various components of computing system 600 may be rearranged in various embodiments, and some embodiments may not require nor include all of the above components, while other embodiments may include additional components, such as specialized processors and additional memory.

Computing system 600 may have additional features such as for example, storage 610, one or more input devices 614, one or more output devices 612, and one or more communication connections 616. An interconnection mechanism (not shown) such as a bus, controller, or network interconnects the components of the computing system 600. Typically, operating system software (not shown) provides an operating system for other software executing in the computing system 600, and coordinates activities of the components of the computing system 600.

The tangible storage 610 may be removable or non-removable, and includes magnetic disks, magnetic tapes or cassettes, CD-ROMs, DVDs, or any other medium which can be used to store information in a non-transitory way, and which can be accessed within the computing system 600. The storage 610 stores instructions for the software implementing one or more innovations described herein.

The input device(s) 614 may be a touch input device such as a keyboard, mouse, pen, or trackball, a voice input device, a scanning device, or another device that provides input to the computing system 600. For video encoding, the input device(s) 614 may be a camera, video card, TV tuner card, or similar device that accepts video input in analog or digital form, or a CD-ROM or CD-RW that reads video samples into the computing system 600. The output device(s) 612 may be a display, printer, speaker, CD-writer, or another device that provides output from the computing system 600.

The communication connection(s) 616 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A document processing system comprising:
   data storage for storing a plurality of documents in image format, the documents comprising one or more sets of documents, each set of documents comprising documents of having similar formatting; and
   a processor programmed with instructions that when executed implement:
   an object recognizer that processes documents in a set of documents from the one or more sets of documents and generates for each document in the set of documents being processed, a set of page objects, wherein the page objects are organized in a two-dimensional arrangement;
   a feature extractor responsive to a set of page objects for extracting known features from each set of page objects of a corresponding processed page by sequentially organizing each object in each set of page objects into a one-dimensional array as a function of location of each object from top-to-bottom and then left-to-right in the corresponding processed page; and
   a template identifier for processing each one-dimensional array by
   comparing each one-dimensional array to a plurality of known one-dimensional arrays, each of the known one-dimensional arrays corresponding to an image encoded document having a known formatting; and
   classifying the document in image format corresponding to the one-dimensional array into a classification having a known formatting upon a match within a predetermined match threshold.

2. The document processing system of claim 1 wherein the feature extractor further converts location of each page object of the corresponding processed page into a first vector measured from a top-right corner from the corresponding processed page to center of the object and into a second vector measured from a bottom-right corner from the corresponding processed page to center of the object and selects the first or the second vector as a function of which of the first or the second vector has a larger magnitude.

3. The document processing system of claim 1 wherein the object recognizer comprises a deep neural network trained to identify objects in at least one of the sets of documents and to generate for each document processed by the deep neural network, a set of page objects.

4. The document processing system of claim 1 wherein the object recognizer comprises an optical character recognizer that generates for each document processed by the optical character recognizer, a set of page objects.

5. The document processing system of claim 1 further comprising a higher order object filter for processing each set of page objects organized in a two dimensional arrangement to generate for each set of page objects the corresponding processed page by removing lower order objects from the set of page objects and wherein the corresponding processed page is provided to the feature extractor as the set of page objects.

6. The document processing system of claim 1 wherein the feature extractor further converts location of each object into a first vector measured from a top-left corner from the corresponding processed page to center of the object and into a second vector measured from a bottom-left corner from the corresponding processed page to center of the object and selects the first or the second vector as a function of which of the first or the second vector has a larger magnitude.

7. The document processing system of claim 1 wherein
   the feature extractor further converts location of each object into a first vector measured from a top-left corner from the corresponding processed page to center of the object and into a second vector measured from a bottom-left corner from the corresponding processed page to center of the object and selects the first or the second vector as a function of which of the first or the second vector has a larger magnitude;
   the feature extractor further converts location of each object into a third vector measured from a top-left corner from the corresponding processed page to center of the object and into a fourth vector measured from a bottom-left corner from the corresponding processed page to center of the object and selects the third or the fourth vector as a function of which of the first or the second vector has a larger magnitude; and
   identifies the selected vector among the first and second vectors corresponding to each object and identifies the selected vector among the third and fourth vectors corresponding to each object and selects a vector from the selected vector among the first and second vectors corresponding to each object and from the selected vector among the third and fourth vectors corresponding to each object.

8. A non-transitory storage medium, having stored thereupon one or more program modules comprising computer-executable instructions for execution on a computer system, the computer-executable instructions causing the computer system to implement a document processing system that interacts with a data storage for storing a plurality of documents in image format, the documents comprising one or more sets of documents, each set of documents comprising documents of having similar formatting; the computer system executing one or more of the program modules that when executed implement:

an object recognizer that processes documents in a set of documents and generates for each document in the set of documents, a set of page objects, wherein the page objects are organized in a two-dimensional arrangement in a corresponding document;

a higher order object filter for processing each set of page objects to generate for each set of page objects a filtered set of page objects by removing lower order objects from the set of page objects and wherein the filtered set of page objects is provided to the feature extractor as the set of page objects;

a feature extractor responsive to a set of page objects for extracting known features from each of the filtered set of page objects by sequentially organizing each object in each of the filtered set of page objects into a data structure, each of the objects being positioned in a corresponding data structure as a function of its location in the corresponding set of page objects;

a template identifier for processing each of the corresponding data structures by
        comparing each of the corresponding data structures to a plurality of predetermined data structures, each of the predetermined data structures corresponding to an image encoded document having a known formatting; and
        classifying at least one document in the set of documents in image format into a classification having a known formatting upon a match from the comparing being within a predetermined match threshold.

9. The non-transitory storage medium of claim 8 wherein the feature extractor sequentially organizes each object in each filtered page into a data structure as a function of location of each object from top-to-bottom and then left-to-right in the corresponding filtered page.

10. The non-transitory storage medium of claim 9 wherein the feature extractor further converts location of each object into a first vector measured from a top-right corner from the corresponding filtered page to center of the object and into a second vector measured from a bottom-right corner from the corresponding filtered page to center of the object and selects the first or the second vector as a function of which of the first or the second vector has a larger magnitude.

11. The non-transitory storage medium of claim 9 wherein the feature extractor further converts location of each object into a first vector measured from a top-left corner from the corresponding filtered page to center of the object and into a second vector measured from a bottom-left corner from the corresponding filtered page to center of the object and selects the first or the second vector as a function of which of the first or the second vector has a larger magnitude.

12. The non-transitory medium of claim 9 wherein
    the feature extractor further converts location of each object into a first vector measured from a top-left corner from the corresponding filtered page to center of the object and into a second vector measured from a bottom-left corner from the corresponding filtered page to center of the object and selects the first or the second vector as a function of which of the first or the second vector has a larger magnitude;
    the feature extractor further converts location of each object into a third vector measured from a top-left corner from the corresponding filtered page to center of the object and into a fourth vector measured from a bottom-left corner from the corresponding filtered page to center of the object and selects the third or the fourth vector as a function of which of the first or the second vector has a larger magnitude; and
    identifies the selected vector among the first and second vectors corresponding to each object and identifies the selected vector among the third and fourth vectors corresponding to each object and selects a vector from the selected vector among the first and second vectors corresponding to each object and from the selected vector among the third and fourth vectors corresponding to each object.

13. The non-transitory storage medium of claim 8 wherein the object recognizer comprises a deep neural network trained to identify objects in at least one of the sets of documents and to generate for each document processed by the deep neural network, a set of page objects.

14. The non-transitory storage medium of claim 8 wherein the object recognizer comprises an optical character recognizer that generates for each document processed by the optical character recognizer, a set of page objects.

15. The non-transitory storage medium of claim 8 wherein the data structure provides a two dimensional arrangement.

\* \* \* \* \*